United States Patent Office 3,389,149
Patented June 18, 1968

3,389,149
4-OXO-2,4,5,6,7,7a-HEXAHYDROHETEROCYCLIC
COMPOUNDS AND PREPARATION THEREOF
Laverne A. Glick, Edison, Harold M. Foster, Middlesex, and Harold A. Kaufman, New Brunswick, N.J., assignors to Mobil Oil Corporation, a corporation of New York
No Drawing. Filed Dec. 20, 1965, Ser. No. 515,228
2 Claims. (Cl. 260—332.3)

ABSTRACT OF THE DISCLOSURE

4 - oxo-2,4,5,6,7,7a-hexahydrobenzothiophene and its oxygen and nitrogen analogues, and alkyl ($C_1$–$C_8$) and alkenyl ($C_2$–$C_8$) derivatives thereof are new compounds that are useful intermediates for producing 4-hydroxybenzothiophenes, benzofurans, and indoles. They can be produced by ring closure of a 3 - (2,2-dialkoxyethylmercapto)-cyclohexanone in the presence of a mineral acid catalyst.

This invention is concerned with novel 4-oxo-hexahydrobenzoheterocyclic compounds and methods for preparing them.

The compounds of this invention are useful intermediates for the preparation of 4-hydroxybenzothiophenes, benzofurans, and indoles. The 4-hydroxybenzothiophenes are converted into benzothienyl carbamates by reaction with phosgene to form the chloroformate, followed by reaction with a primary or secondary amine or by reaction with an isocyanate. They are an effective class of pesticides, which control a variety of pests, including root knot nematode, two-spotted spider mite, Mexican bean beetle, Southern armyworm, pea aphid, and house fly, as fully disclosed in copending application Ser. No. 487,333, filed Sept. 14, 1965, now U.S. Patent No. 3,288,673, a continuation-in-part of copending application Ser. No. 427,089, filed Jan. 21, 1965, now U.S. Patent No. 3,288,808, a continuation-in-part of copending application Ser. No. 334,581, filed Dec. 30, 1963, now abandoned, a continuation-in-part of application Ser. No. 220,073, filed Aug. 28, 1962 now abandoned. The compounds of this invention are converted into 4-hydroxybenzothiophenes by liquid or vapor phase dehydrogenation. Typical procedures for effecting such dehydrogenation are described in copending applications Ser. No. 455,604, filed May 13, 1965 now U.S. Patent No. 3,345,382; Ser. No. 458,771, filed May 25, 1965 now U.S. Patent No. 3,317,552; and Ser. No. 468,094, filed June 29, 1965 now U.S. Patent No. 3,335,152.

Accordingly, it is a broad object of this invention to provide novel hexahydrobenzoheterocyclic compounds. Another object is to provide intermediates for the preparation of an effective class of pesticides. A specific object is to provide 4-oxo-2,4,5,6,7,7a-hexahydrobenzothiophene, lower alkyl derivatives thereof, and a process for preparing them. Other objects and advantages of this invention will become apparent to those skilled in the art, from the following detailed description.

This invention provides compounds having the formula:

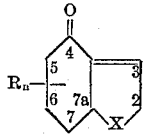

wherein R is alkyl ($C_1$–$C_8$), alkenyl ($C_2$–$C_8$), alkoxy ($C_1$–$C_4$), alkylthio ($C_1$–$C_4$), di ($C_1$–$C_4$)alkylamino, or cyano, n is 0 to 3, and X is selected from the group consisting of O, S, and NR′ wherein R′ is lower alkyl ($C_1$–$C_4$) or H.

This invention also provides a method of preparing these compounds that comprises heating a 3 - (2,2 - dialkoxyethylmercapto)cyclohexanone in the presence of a mineral acid catalyst.

The novel compounds of this invention are 4-oxo-2,4,5,6,7,7a-hexahydrobenzoheterocyclic compounds, i.e., 4 - oxo - 2,4,5,6,7,7a - hexahydrobenzothiophene and the corresponding hexahydrobenzofuran and hexahydroindole. As indicated in the structural formula set forth hereinbefore, the compound can have lower alkyl ($C_1$–$C_4$) substituents. In the case of indole, there can be a lower alkyl group attached to the heterocyclic nitrogen atom. Non-limiting examples of the compounds of this invention are 4 - oxo - 2,4,5,6,7,7a - hexahydrobenzofuran; 4 - oxo 1,4,5,6,7,7a - hexahydro - 7 - methylbenzothiophene; 4 - oxo - 2,4,5,6,7,7a - hexahydroindole; 4 - oxo-2,4,5,6,7,7a - hexahydro - 6,7 - dimethylbenzofuran; 4 - oxo - 2,4,5,6,7,7a - hexahydro - 6 - butylbenzothiophene; 4 - oxo-2,4,5,6,7,7a - hexahydro - 6 - octylbenzothiophene; 4-oxo-2,4,5,6,7,7a - hexahydro - 7 - methylbenzothiophene; 4-oxo - 2,4,5,6,7,7a - hexahydro - 6 - hexenylbenzothiophene; 4 - oxo - 2,4,5,6,7,7a - hexahydro-7-propenylbenzothiophene; 4 - oxo - 2,4,5,6,7,7a - hexahydro-N-propylindole; and 4 - oxo - 2,4,5,6,7,7a - hexahydro - 5-butyl-N-methylindole.

It must be strictly understood that, as new compounds, the compounds of this invention are not to be limited by the method used to prepare them. Several methods can be employed. A particularly effective method for preparing these compounds, however, is a ring closure involving heating a 3-(2,2-di-lower alkoxyethylmercapto)cyclohexanone in the presence of an acid catalyst. In the case of the benzofuran and indole compounds, the corresponding oxy or amino compound is used. Thus, the starting material for preparing the benzothiophene compounds by this ring closure method has the structure:

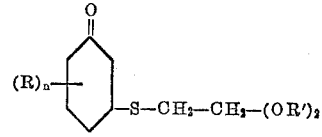

wherein R is as above-defined, n is 0 to 3, and R′ is lower alkyl ($C_1$–$C_4$) or

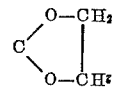

These compounds are described in copending application Ser. No. 515,252, filed concurrently herewith. The corresponding benzofuran compounds and indole compounds are prepared from materials having the structures, respectively:

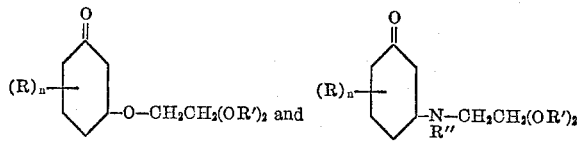

wherein R, R′, and n are as above and R″ is hydrogen or lower alkyl ($C_1$–$C_4$). Generically, the starting material structure will be:

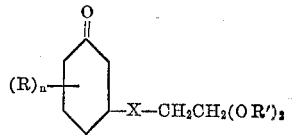

wherein X is O, S, or NR″ and R, R′, and n are as above. Non-limiting examples of starting materials in the process of this invention are 3-(2,2-dibutoxyethylmercapto)cyclohexanone;
3-(2,2-diethoxyethyloxy)cyclohexanone;
3-(2,2-dimethoxyethylamino)cyclohexanone;
3-(2,2-dipropoxyethylmercapto)-4-butylcyclohexanone;
3-(2,2-diethoxyethyloxy)-5-octylcyclohexanone;
3-(2,2-dimethoxyethylamino)-6-hexenylcyclohexanone;
3-(2,2-dibutoxyethylmercapto)-5-propenylcyclohexanone; and
3-(2,2-dimethoxyethylmercapto)-6-methylcyclohexanone.

The cyclization reaction can be carried out at atmospheric pressures at temperatures of between about 70° C. and about 100° C. It is preferred, however, to operate at the more elevated temperatures and a temperature of about 90° C. has been found very feasible. If a pressure vessel is used, temperatures up to about 120° C. can be employed in order to speed the reaction. Temperatures higher than 120° should be avoided, however, because the reaction products show some thermal instability.

The catalyst for the cyclization reaction is a mineral acid. Hydrochloric acid appears to be a preferred catalyst, but other mineral acids, such as phosphoric and sulfuric acids can be used.

The reaction proceeds rapidly, smoothly, and in high yield when an inert solvent, such as toluene or xylene is used. Xylene is preferred although cyclization appears to be slower with this solvent. When xylene is employed, the reaction requires about 1 hour at 90° C., but a high yield (86–95%) of pure product was obtained. The amount of solvent used will be between about 2 volumes and about 10 volumes per volume of starting material. Other aromatic acyclic and alicyclic hydrocarbons can be employed, but one should be chosen that will form an azeotrope with alcohol and water at about 90° C.

It has been found that the reaction can be carried out in the absence of solvent using 1 to 35% aqueous hydrochloric acid at about 90° C. with reaction times of 20 minutes to 2 minutes, respectively. It was found, however, that yields of product were lower when concentrated hydrochloric acid was used.

The following specific examples illustrate the novel compounds of this invention and their preparation by means of the cyclization process.

Example 1

To 10 parts 90% purity (9 parts actual) of 3-(2,2-diethoxyethylmercapto)cyclohexanone and 34.5 parts xylene preheated to 96° was added 2.8 parts of hot 10% aqueous hydrochloric acid. The vigorously stirred mixture foams slightly as an azeotrope (89°) of xylene, ethanol and water is formed. The refluxing mixture is stirred for 1 hour at which time vapor phase chromatography (see Example II) indicated 100% conversion and 95% yield of 4-oxo-2,4,5,6,7,7a-hexahydrobenzothiophene. The aqueous alcoholic layer is removed and extracted with xylene. The combined xylene layers are stripped of solvent and the residue is distilled. The product, 4.62 parts (86% yield) had B.P. 86°/0.5 mm. and crystallized on standing.

The product was recrystallized twice from 30–60° petroleum ether (ligroin) to give white crystals, M.P. 49–51, whose ultraviolet, infrared and nuclear magnetic resonance spectra are in accord with the assigned structure. Molecular weight, as determined by vapor phase osmometry, was within experimental error of the theoretical 154 (150±7.5).

*Analysis.*—Calc'd. for $C_8H_{10}OS$: C, 62.32; H, 6.54. Found: C, 62.05, 62.30; H, 7.14, 7.06.

Example 2

To 1 part 3-(2,2-diethoxyethylmercapto)cyclohexanone, preheated to 95°, is added 1.4 parts 10% aqueous hydrochloric acid with vigorous shaking. After 1 minute the mixture becomes homogeneous followed by separating of insoluble product (4-oxo-2,4,5,6,7,7a-hexahydrobenzothiophene). After 5 minutes 4.3 parts xylene is added and the organic phase is separated and analyzed by vapor phase chromatography employing, as internal standard, a weighed quantity of methyl laurate. The indicated yield is 68%.

For analytical purposes an F & M model 720, Dual Column Vapor Phase Chromatograph with a hot wire detector was employed. A 2' x ¼" stainless steel tube packed with 10% General Electric XE 60 silicone nitrile oil on 60–80 mesh Diataport W–AW was used with a flow rate of 60/ml./min. helium measured at the exit port with 40 p.s.i.g. inlet pressure. The column was programed from 100° at injection to 250° at 10°/min. and held at that temperature until all materials had eluated. Injection port temperature —300°, detector block temperature —350°, detector current —100 ma.

Using these conditions the following retention times were noted:

| Compound: | Retention time (relative to injection) (Min.) |
|---|---|
| Cyclohexenone | 3.6–3.8 |
| 3-(2',2'-diethoxyethylthio)-cyclohexenone | 14.5–14.8 |
| 4-keto-2,4,5,6,7,7a-hexahydrobenzothiophene | 11.5–11.7 |
| 4-keto-4,5,6,7-tetrahydrobenzothiophene | 10.2–10.5 |
| Methyl laurate | 8.0–8.2 |

Example 3

A reaction mixture, 45.6 parts, obtained by reaction of 20 parts cyclohexenone with 26.5 parts dimethyl mercaptoacetal and 0.5 part piperidine, was preheated to 95° with 187 parts xylene and was treated with 14 parts hot 10% aqueous hydrochloric acid. After 1.5 hours of refluxing at 86° with vigorous stirring, the mixture was cooled and worked up as per Example I. 26.7 parts distillate were obtained which contained 17.6 parts (54% yield based on starting cyclohexenone) of 4-oxo-2,4,5,6,7,7a-hexahydrobenzothiophene.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A compound having the formula:

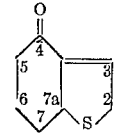

wherein R is selected from the group consisting of alkyl ($C_1$–$C_4$) and alkenyl ($C_2$–$C_4$) and $n$ is 0 to 3.

2. The compound defined in claim 1, wherein $n$ is 0.

References Cited

UNITED STATES PATENTS 3,070,606 12/1962 Anderson _____ 260—330.5
3,084,168 3/1963 Hearne _____ 260—340

OTHER REFERENCES

Tilichenko et al., Chemical Abstracts vol. 57, col. 11042e (1962).

Fieser et al., Advanced Organic Chemistry (1961) pp. 441–3.

Morrison et al., Organic Chemistry (1959) pp. 646–40.

JOHN D. RANDOLPH, *Primary Examiner.*

WALTER A. MODANCE, N. S. MILESTONE, *Examiners.*

C. M. SHURKO, *Assistant Examiner.*

UNITED STATES PATENT OFFICE
CERTIFICATE OF CORRECTION

Patent No. 3,389,149                      June 18, 1968

Laverne A. Glick et al.

It is certified that error appears in the above identified patent and that said Letters Patent are hereby corrected as shown below:

Column 2, line 15, "4-oxo-1" should read -- 4-oxo-2 --. Column 4, line 13, "eluated" should read -- eluted --; line 50, claim 1, in the diagram insert -- $(R)_n$ --, at the left-hand side.

Signed and sealed this 9th day of December 1969.

(SEAL)
Attest:

Edward M. Fletcher, Jr.                WILLIAM E. SCHUYLER, JR.
Attesting Officer                          Commissioner of Patents